United States Patent
Jiang et al.

(10) Patent No.: US 7,324,704 B2
(45) Date of Patent: Jan. 29, 2008

(54) METHOD OF REPAIRING SCRATCHES IN DIGITAL IMAGES

(75) Inventors: Yan-Ru Jiang, Beijing (CN); Po-Chiang Yeh, Beijing (CN); Rui-Jing Dong, Beijing (CN)

(73) Assignee: Primax Electronics Ltd., Taipei (TW)

( * ) Notice: Subject to any disclaimer, the term of this patent is extended or adjusted under 35 U.S.C. 154(b) by 754 days.

(21) Appl. No.: 10/659,265

(22) Filed: Sep. 11, 2003

(65) Prior Publication Data

US 2005/0058366 A1    Mar. 17, 2005

(51) Int. Cl.
*G06K 9/40* (2006.01)

(52) U.S. Cl. ............... 382/275; 382/260; 382/274; 382/282; 358/3.26; 358/3.27; 358/463; 345/612; 345/618

(58) Field of Classification Search ......... 382/260, 382/274, 275, 252, 282; 358/3.26, 3.27, 358/463; 345/612, 616, 618
See application file for complete search history.

(56) References Cited

U.S. PATENT DOCUMENTS

| | | | |
|---|---|---|---|
| 5,266,805 A * | 11/1993 | Edgar ............... | 250/330 |
| 6,021,011 A * | 2/2000 | Behrens et al. ......... | 360/51 |
| 6,285,349 B1 * | 9/2001 | Smith ............... | 345/690 |
| 6,304,678 B1 * | 10/2001 | Yang et al. ........... | 382/268 |
| 6,388,704 B1 * | 5/2002 | Wischermann ......... | 348/125 |
| 6,493,878 B1 * | 12/2002 | Kassatly ............. | 725/144 |
| 6,539,106 B1 * | 3/2003 | Gallarda et al. ........ | 382/149 |
| 6,633,683 B1 * | 10/2003 | Dinh et al. ........... | 382/260 |
| 6,636,646 B1 * | 10/2003 | Gindele .............. | 382/274 |
| 6,675,125 B2 * | 1/2004 | Bizjak ............... | 702/179 |
| 6,816,197 B2 * | 11/2004 | Keshet et al. .......... | 348/273 |
| 7,020,346 B2 * | 3/2006 | Dupont et al. ......... | 382/275 |

* cited by examiner

*Primary Examiner*—Yosef Kassa
(74) *Attorney, Agent, or Firm*—Birch, Stewart, Kolasch & Birch, LLP

(57) ABSTRACT

A method of repairing scratches in a digital image includes counting the number of abnormal pixels among neighboring pixels of a selected pixel. The selected pixels that are surrounded by abnormal pixels in a number greater than a predetermined value are designed as particular pixels. An area surrounding each particular pixel is divided into a plurality of blocks. Furthermore, brightness difference between two of the blocks are calculated. Scratch pixels are found from the particular pixels based on brightness difference between blocks. Then, an area surrounded by scratch pixels are subdivided and filled up. Thereby, the scratch pixels can be precisely found and repaired without the need of hardware.

9 Claims, 5 Drawing Sheets

METHOD OF REPAIRING SCRATCHES IN DIGITAL IMAGES

BACKGROUND OF THE INVENTION

1. Field of Invention

The present invention relates to an image processing method, and more particularly to a method of repairing scratches in digital images.

2. Related Art

As digital technology progresses, the way to process images has significantly changed. Much more information can be processed, stored and transmitted digitally. The digital images are formed by means of digital cameras or image scanners, or directly generated by drawing software applications. The quality of digital images is based on the quality of the image originals and the quality of the used input/output equipment. Good performance of the input equipment greatly influences the quality of the acquired image.

The image original, which may be for example, a document sheet, may be scratched or damaged by dust or fine particles. Therefore, the acquired digital image usually needs to be repaired to recover its intact appearance.

Currently, repairing images is mainly performed on films, for example, an 'automatic scratch remover', which is a new technology in the scanning art. A film scanner is a high level electronic image-related product that needs advanced photoelectric technology and high production quality.

In the present state of the art, scratches are found by hardware, resulting in non-satisfactory repairing with high processing costs. Applications such as PHOTOSHOP repair the damaged image on the film with a complicated operation and are substantially time-consuming. Usually it takes several hours to repair a fine scratch. Such an image repair process is not efficient.

Furthermore, the method of processing scratches in the digital image includes finding out where the scratches are located, and repairing them. Presently, localization of the scratches is more difficult than repairing the scratches. Therefore, there is a need for a method of repairing scratches in digital images, which can precisely locate the scratches.

SUMMARY OF THE INVENTION

It is therefore an object of the invention to provide a method of repairing scratches in a digital image, and precisely find the scratches. Further, to repair the images without the need of hardware.

In order to achieve the above and other objectives, the method of repairing scratches in a digital image includes calculating a brightness difference between a selected pixel and one of neighboring pixels that surround the selected pixel. The number of abnormal pixels among the neighboring pixels then is counted. The selected pixels that are surrounded by the abnormal pixels in a number more than a predetermined value are designated as particular pixels. An area surrounding each particular pixel then is divided into a plurality of blocks. The brightness difference between the blocks then is calculated. The scratch pixels are distinguished from the particular pixels based on brightness difference between blocks. Lastly, an area surrounded by scratch pixels is subdivided and filled up.

According to the invention, the scratches are found rapidly and precisely without the need of hardware. The results provided by the method of the invention are better, while the processing costs are reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below illustration only, and is thus not limitative of the present invention, and wherein.

DETAILED DESCRIPTION OF THE INVENTION

The invention is illustrated with reference to the accompanied drawings.

A method of repairing scratches in a digital image according to the invention is implemented to repair digital images captured by digital cameras, scanners, or formed by drawing software applications.

Figure 1:
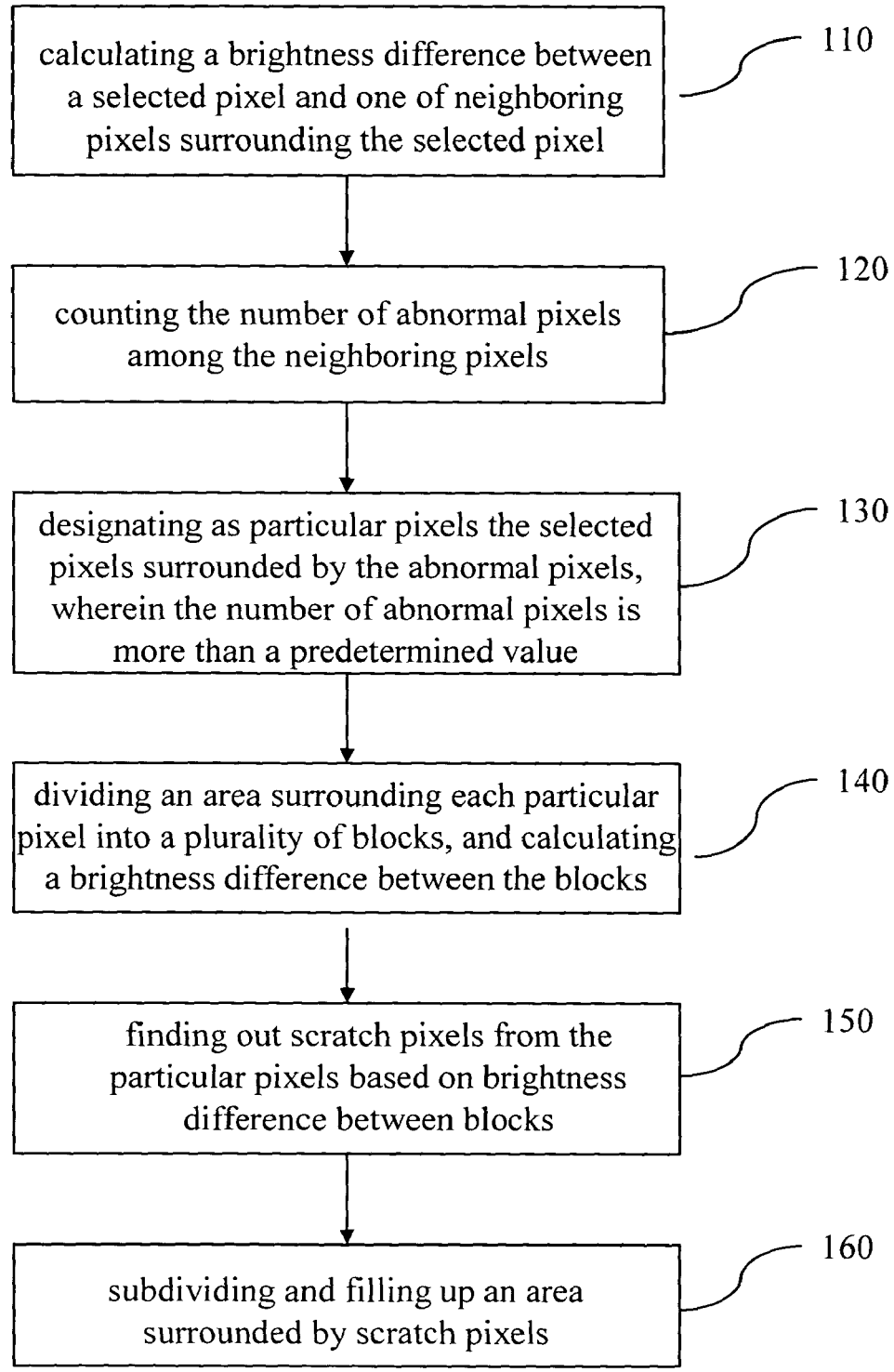
FIG. 1 is a schematic view illustrating a method of repairing scratches on a digital image according to the invention.

FIG. 1 is a schematic view illustrating a method of repairing scratches on a digital image according to the invention. First, calculating brightness difference between a selected pixel Y (i, j) and neighboring pixels (step 110). Then count the number of abnormal pixels among these neighboring pixels (step 120). When the number of abnormal pixels is greater than a predetermined value, the pixels in question are designated as particular pixels (step 130). Peripheral areas around the particular pixels are divided into a plurality of blocks, and brightness differences between adjacent blocks are estimated (step 140). Scratch pixels are picked among the particular pixels based on the difference between the adjacent blocks (step 150). Finally, the peripheral areas around the scratch pixels are subdivided and filled up (step 160).

Figure 2:
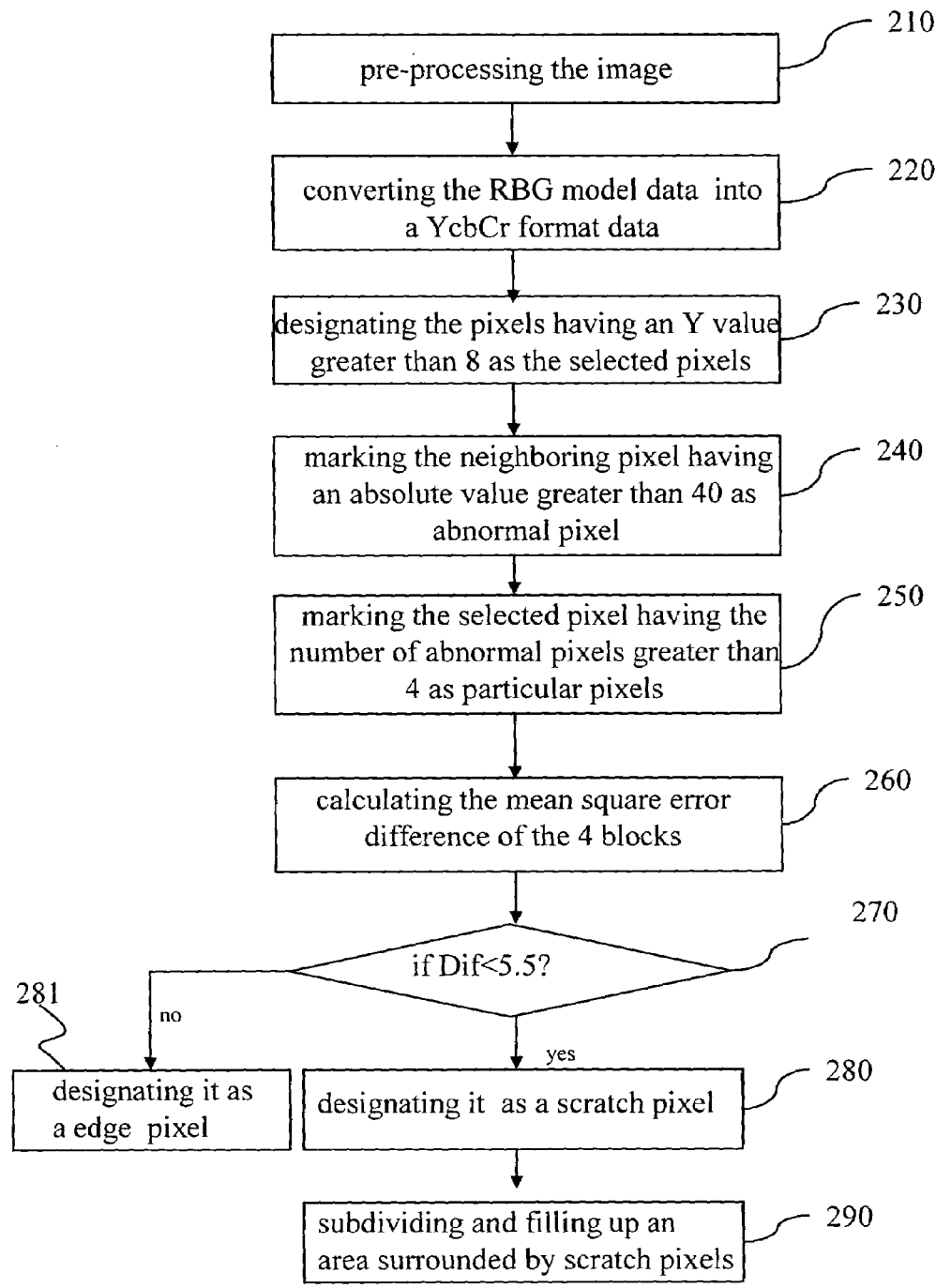
FIG. 2 is a flowchart of a method of repairing scratches on a digital image according to one embodiment of the invention.

FIG. 2 is a flowchart of a method of repairing scratches on a digital image according to one embodiment of the invention. The images are pre-processed (step 210). Practically, the crude image acquired is not perfect due to noise, reflection or illumination. Therefore, pre-processing is necessary. Pre-processing of the crude images includes image brightening, filtering and sharpening. Image filtering eliminates or weakens the spots, stains, scratches, and voids, etc. to improve the image quality.

The images acquired by sensors are constituted by RGB values widely used in color systems. The RGB are major colors with respect to people's visual sense for color representation. In the invention, the RBG model data are converted into a YcbCr format data (step 220), wherein Y is brightness, and Cb and Cr respectively represent hue and saturation. Here, only Y value is obtained.

Converting RGB format to YcbCr format are common data conversions that use a conversion coefficient. The conversion is accomplished as follows:

$Y=0.2990R+0.5870G+0.1140B$ $Cb=-0.1687R-0.3313G+0.5000B+128$ $Cr=0.5000R-0.4187G-0.0813B+128$

Precise localization of scratches is crucial to scratch processing. Scratch localization distinguishes scratch areas on the image and marks them as scratch pixels. Each pixel corresponds to one Y value representing its brightness. The brightness of scratch pixels is greater than that of normal pixels. Therefore, the brighter pixels are picked as 'selected pixels'. The brighter pixels have Y values greater than a predetermined brightness value, for example 80 in this embodiment. That is, the pixels having an Y value greater than 80 are the selected pixels (step 230).

Figure 3:
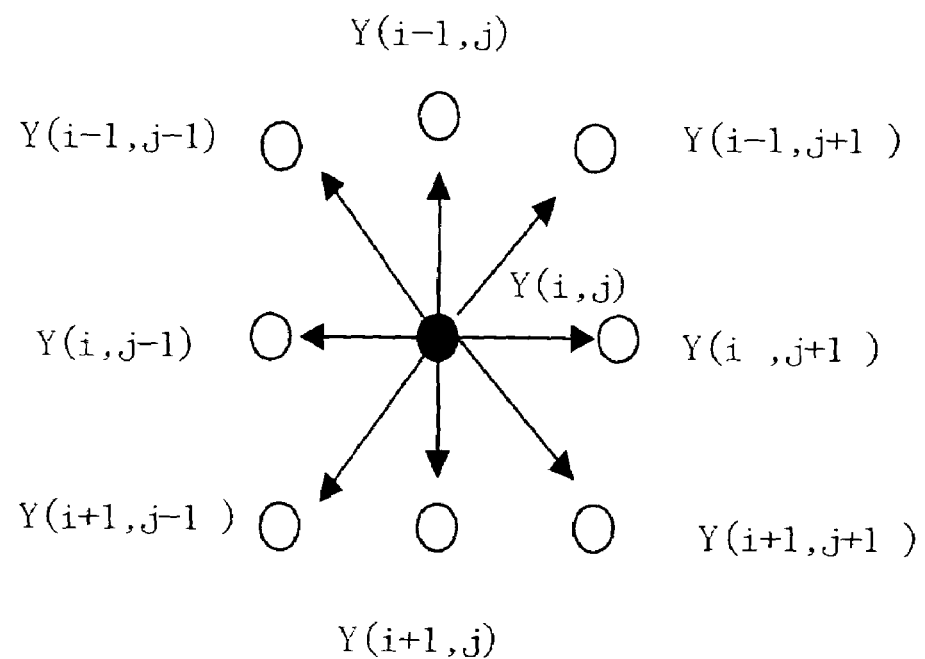
FIG. 3 is a schematic view of neighboring pixels of a selected pixel according to the invention; and FIG. 4A~
Figure 4A:
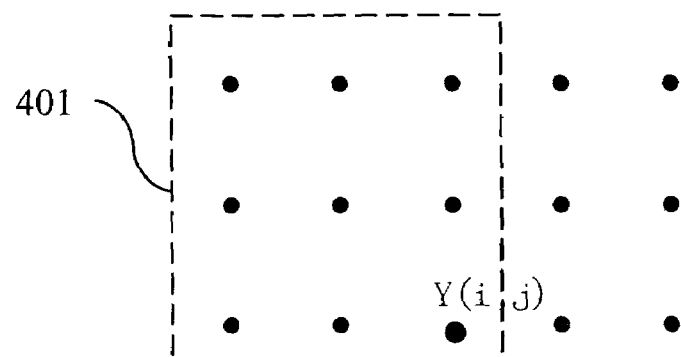
FIG. 4D is a schematic view of blocks of an area surrounding a particular pixel according to the invention.
Figure 4B:
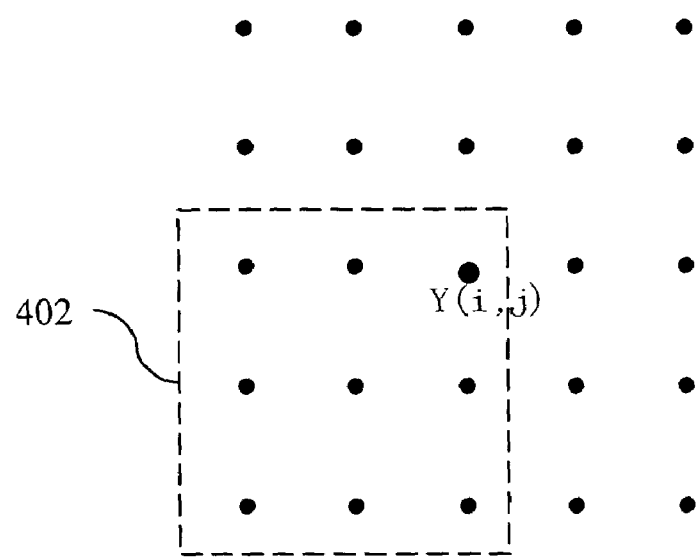
Figure 4C:
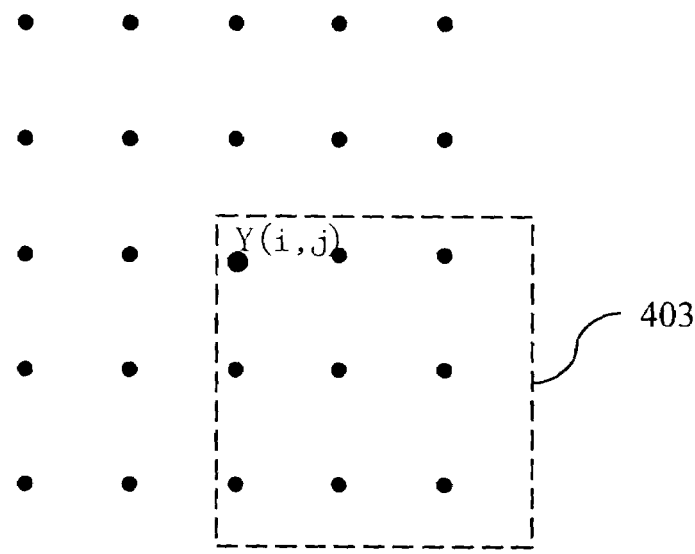
Figure 4D:
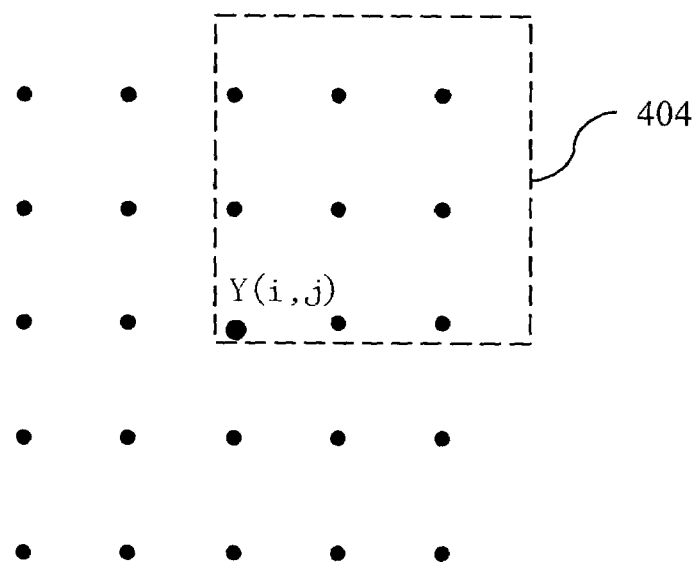

Referring to FIG. 3, each selected pixel is surrounded by 8 neighboring pixels spaced uniformly. The following table illustrates a group including the target pixel and the neighboring pixels:

| | | |
|---|---|---|
| $Y(i-1, j-1)$ | $Y(i-1, j)$ | $Y(i-1, j+1)$ |
| $Y(i, j-1)$ | $Y(i, j)$ | $Y(i, j+1)$ |
| $Y(i+1, j-1)$ | $Y(i+1, j)$ | $Y(i+1, j+1)$ |

Here below is an example according to the above table.

$Y(i-1,j-1)Y(i-1,j)Y(i-1,j+1)$ $Y=Y(i,j-1)Y(i,j)Y(i,j+1)=Y(i+1,j-1)Y(i+1,j)Y(i+1,j+1)$

| | | |
|---|---|---|
| 217.0273 | 200.8299 | 122.9947 |
| 206.0808 | 161.8376 | 108.1474 |
| 180.5265 | 109.3145 | 88.5259 |

There may be abnormal pixels among these neighboring pixels. For one given selected pixel, the brightness difference between each abnormal pixel and the selected pixel is greater than that between each of the normal neighboring pixels and the selected pixel. All the abnormal pixels have to be found and marked. The way to find the abnormal pixels is to calculate an absolute value of brightness difference between each neighboring pixel and their corresponding selected pixel. If the absolute value is greater than an abnormal standard, then the corresponding neighboring pixel is marked as an abnormal pixel. In this embodiment, the abnormal standard is 40, and any neighboring pixel having an absolute value greater than 40 is marked as 'abnormal pixel' (step 240).

Thereafter, abnormal pixels around each selected pixel are summed up. If the resulting number of abnormal pixels around each selected pixel is greater than a predetermined value, the selected pixel is designated as a particular pixel. The predetermined value is, for example, 4. All the particular pixels are found according to the above manner (step 250).

The particular pixels are the selected pixels having greater brightness and greater amount of abnormal neighboring pixels. The particular pixels may be either scratch pixels or edge pixels. Now, the scratch pixels are distinguished from the edge pixels. The edge pixels are the pixels with the greatest change in brightness at certain locations of the image. In contrast to the edge pixels, the contrast between one scratch pixel and its neighboring pixels is small. The area surrounding each particular pixel is divided into a plurality of blocks, for example, 3, 4 or 8 blocks. In the illustration of FIG. 4A to FIG. 4D, the surrounding area is divided into 4 blocks respectively designated as block 401, block 402, block 403 and block 404, each block including 9 neighboring pixels. A mean square error of 9 neighboring pixels of each block for each particular pixel is estimated. Then calculate the mean square error difference of the 4 blocks (step 260). The mean square error difference is calculated according to the following expression.

Dif=MaxVar−Mid1Var−Mid2Var+MinVar whereinDif is a difference of the mean sqaure error, MaxVar is a maximum mean square error, MinVar is a minimum mean square error, and Mid1Var and Mid2Var are middle values among the four mean square error values. If a particular pixel has a Dif smaller than a difference standard, then it is a scratch pixel. On the other hand, if a particular pixel has a Dif value greater than the difference standard, then it is a edge pixel. The difference standard is in the range of 5~8. In this embodiment, the difference standard is 5.5. That is if MaxVar−Mid1Var−Mid2Var+MinVar<5.5 (step 270), the particular pixel is designated as a scratch pixel (step 280), otherwise as a edge pixel (step 281).

When the number of blocks is 3, then the expression used to calculate Dif value is: MaxVar−2Mid1Var+MinVar. In contrast to the situation of 4 blocks, MidVar is a middle among the three mean square error values.

After the scratch pixel is determined, the scratch can be found according to the areas surrounded by the scratch pixels. The area surrounded by the scratched pixels usually need to be further subdivided. Morph technology is a pixel interpolation method widely used in two-dimensional animation, especially in movie trick shots. Morph technology makes up different film sections as a continuous frame. The invention uses Morph technology to subdivide the area surrounded by the scratch pixels and then Convert YcbCr format to RGB format. At last in RGB format fill up the subdivided areas (step 290). In filling up the subdivided areas, mean values of the pixels surrounding the scratch replace that of the scratch to achieve image repairing.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of repairing scratches in digital images, the method comprising:

calculating a brightness difference between a selected pixel and one of neighboring pixels surrounding the selected pixel;

counting the number of abnormal pixels among the neighboring pixels;

designating as particular pixels the selected pixels surrounded by the abnormal pixels, wherein the number of abnormal pixels is more than a predetermined value;

dividing an area surrounding each particular pixel into a plurality of blocks, and calculating a brightness difference between the blocks;

finding out scratch pixels from the particular pixels based on brightness difference between blocks; and subdividing and filling up an area surrounded by scratch pixels, wherein the step of calculating brightness difference between the blocks includes estimating a mean square error of each block which has a plurality of pixels, and calculating the difference between the mean square errors.

2. The method of claim 1, wherein a neighboring pixel is an abnormal pixel when an absolute value of the brightness difference between the neighboring pixel and its corresponding selected pixel is greater than an abnormal standard.

3. The method of claim 1, wherein the particular pixels include scratch pixels and edge pixels.

4. The method of claim 1, wherein the area surrounding each particular pixel is divided into 4 blocks.

5. The method of claim 1, wherein the area surrounding each particular pixel is divided into 3 blocks.

6. The method of claim 1, wherein the area surrounding each particular pixel is divided into 8 blocks.

7. The method of claim 1, wherein if the number of blocks is 4, then the difference between the mean square errors is obtained according to the following expression:

Dif=MaxVar−2MidVar+MinVar, wherein Dif is a difference of the mean square errors, MaxVar is a maximum mean square error, MinVar is a minimum mean square error, and MidVar is a middle among the three mean square error values.

8. The method of claim 1, wherein if the number of blocks is 3, then the difference between the mean square errors is obtained according to the following expression:

Dif=MaxVar−2MidVar+MinVar, wherein Dif is a difference of the mean sqaure errors, MaxVar is a maximum mean square error, MinVar is a minimum mean square error, and MidVar is a middle among the three mean square error values.

9. The method of claim 1, wherein at the step of finding out scratch pixels from the particular pixels based on brightness difference between blocks, if the particular pixel has a Dif smaller than a difference standard, then the particular pixel is a scratch pixel, otherwise the particular pixel is an edge pixel.

* * * * *